US010678021B2

(12) United States Patent
Sekine et al.

(10) Patent No.: US 10,678,021 B2
(45) Date of Patent: Jun. 9, 2020

(54) IMAGING LENS

(71) Applicant: KANTATSU CO., LTD., Yaita-shi, Tochigi (JP)

(72) Inventors: Yukio Sekine, Sukagawa (JP); Kenichi Kamada, Sukagawa (JP); Koji Nitta, Tokyo (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 16/146,612

(22) Filed: Sep. 28, 2018

(65) Prior Publication Data
US 2019/0265438 A1   Aug. 29, 2019

(30) Foreign Application Priority Data

Sep. 29, 2017   (JP) ................. 2017-189361

(51) Int. Cl.
*G02B 9/62* (2006.01)
*G02B 7/02* (2006.01)
*H04N 5/225* (2006.01)

(52) U.S. Cl.
CPC ............... *G02B 9/62* (2013.01); *G02B 7/021* (2013.01); *H04N 5/2254* (2013.01)

(58) Field of Classification Search
CPC ............................. G02B 13/0045; G02B 9/62
See application file for complete search history.

(56) References Cited

U.S. PATENT DOCUMENTS 9,417,434 B1 * 8/2016 Huang ............... G02B 13/0045
2015/0109692 A1  4/2015 Son 2016/0170182 A1  6/2016 Tanaka
2017/0315334 A1  11/2017 Liao et al.
2018/0045913 A1  2/2018 Hsueh et al.
2018/0129020 A1  5/2018 Teraoka
2018/0149836 A1  5/2018 Ko
(Continued)

FOREIGN PATENT DOCUMENTS

CN   204790153 U   11/2015
CN   105988187 A   10/2016
(Continued)

*Primary Examiner* — Joseph P Martinez
(74) *Attorney, Agent, or Firm* — Hamre, Schumann, Mueller & Larson, P.C.

(57) ABSTRACT

There is provided an imaging lens with excellent optical characteristics which satisfies demand of wide field of view, low-profileness and low F-number in well balance.
An imaging lens comprises in order from an object side to an image side, a first lens, a second lens, a third lens, a fourth lens having a concave surface facing the object side near an optical axis, a fifth lens, and a sixth lens having the concave surface facing the image side near the optical axis and negative refractive power, wherein said second lens has a convex surface facing the object side near the optical axis, composite refractive power of said second lens, said third lens and said fourth lens is negative, and below conditional expressions (1) and (2) are satisfied:

$$0.85 < vd1/(vd2+vd3) < 1.95 \quad (1)$$

$$0.15 < vd5/vd6 < 0.55 \quad (2)$$

where
vd1: abbe number at d-ray of the first lens,
vd2: abbe number at d-ray of the second lens,
vd3: abbe number at d-ray of the third lens,
vd5: abbe number at d-ray of the fifth lens, and
vd6: abbe number at d-ray of the sixth lens.

19 Claims, 8 Drawing Sheets

(56) References Cited

U.S. PATENT DOCUMENTS

2018/0172956 A1 6/2018 Son
2018/0203208 A1 7/2018 Hsueh et al.
2019/0086640 A1 3/2019 Fukaya

FOREIGN PATENT DOCUMENTS

| CN | 106802473 A | 6/2017 |
| CN | 108089309 A | 5/2018 |
| CN | 109085691 A | 12/2018 |
| JP | 2016-114803 A | 6/2016 |
| JP | 6085060 B | 2/2017 |

* cited by examiner

IMAGING LENS

The present application is based on and claims priority of a Japanese patent application No. 2017-189361 filed on Sep. 29, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and high-performance smartphone and mobile phone, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and to have high-resolution performance. For Example, the following Patent Document 1 and Patent Document 2 disclose the imaging lens comprising six lenses.

Patent Document 1 (JP2016-114803A) discloses an imaging lens comprising, in order from an object side, a first lens having a convex surface facing the object side and positive refractive power, a second lens having negative refractive power, a third lens having the convex surface facing the object side, a fourth lens having positive refractive power, a fifth lens having the negative refractive power, and a sixth lens having the negative refractive power.

Patent Document 2 (JP6085060B) discloses an imaging lens comprising, in order from an object side, a first lens having the positive refractive power, a second lens having the negative refractive power, a third lens having the negative refractive power, a fourth lens having the positive refractive power, a fifth lens having the negative refractive power, and a sixth lens having the negative refractive power.

SUMMARY OF THE INVENTION

However, in lens configurations disclosed in the above-described Patent Documents 1 and 2, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, a convex surface, a concave surface or a plane surface of lens surfaces implies that a shape of the lens surface near an optical axis (paraxial portion), and refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object to an image plane, when thickness of an IR cut filter or a cover glass which may be arranged between the imaging lens and the image plane is regarded as an air.

An imaging lens according to the present invention forms an image of an object on a solid-state image sensor, and comprises in order from an object side to an image side, a first lens, a second lens, a third lens, a fourth lens having a concave surface facing the object side near an optical axis, a fifth lens and a sixth lens having the concave surface facing the image side near the optical axis and negative refractive power.

The imaging lens having the above-described configuration achieves the wide field of view and the low-profileness by strengthening the refractive power of the first lens. The second lens properly corrects spherical aberration and chromatic aberration occurred at the first lens. The third lens properly corrects coma aberration, astigmatism and distortion. The fourth lens appropriately controls light ray incident angle to the fourth lens by having the concave surface facing the object side near the optical axis, and properly corrects the chromatic aberration and the astigmatism. The fifth lens properly corrects the astigmatism, field curvature and the distortion. The sixth lens maintains the low-profileness and secures back focus by having the concave surface facing the image side and the negative refractive power. Furthermore, the chromatic aberration, the distortion, the astigmatism and the field curvature are properly corrected.

According to the imaging lens having the above-described configuration, it is preferable that an object-side surface of the second lens has the convex surface facing the object side near the optical axis.

When the object-side surface of the second lens is the convex surface facing the object side near the optical axis, the second lens properly corrects the spherical aberration and the astigmatism.

According to the imaging lens having the above-described configuration, it is preferable that an object-side surface of the fifth lens is the convex surface facing the object side near the optical axis.

When the object-side surface of the fifth lens is the convex surface facing the object side near the optical axis, the fifth lens properly corrects the astigmatism and the field curvature.

According to the imaging lens having the above-described configuration, it is preferable that a below conditional expression (1) is satisfied:

$$0.85 < vd1/(vd2+vd3) < 1.95 \qquad (1)$$

where
$vd1$: abbe number at d-ray of the first lens,
$vd2$: abbe number at d-ray of the second lens, and
$vd3$: abbe number at d-ray of the third lens.

The conditional expression (1) defines relationship between the abbe numbers at d-ray of the first lens, the second lens and the third lens, and is a condition for properly correcting aberrations. By satisfying the conditional expression (1), the chromatic aberration is properly corrected.

According to the imaging lens having the above-described configuration, it is preferable that a below conditional expression (2) is satisfied:

$$0.15 < vd5/vd6 < 0.55 \qquad (2)$$

where vd5: abbe number at d-ray of the fifth lens, and vd6: abbe number at d-ray of the sixth lens.

The conditional expression (2) defines relationship between the abbe numbers at d-ray of the fifth lens and the sixth lens, and is a condition for properly correcting aberrations. By satisfying the conditional expression (2), the chromatic aberration is properly corrected.

According to the imaging lens having the above-described configuration, it is preferable that the refractive power of the fourth lens is positive, and more preferable that a below conditional expression (3) is satisfied:

$$1.5 < f4/f < 4.0 \tag{3}$$

where f4: focal length of the fourth lens, and f: focal length of the overall optical system of the imaging lens.

When the refractive power of the fourth lens is positive, the low-profileness becomes more facilitated. The conditional expression (3) defines the refractive power of the fourth lens, and is a condition for achieving the low-profileness and the proper aberration corrections. When a value is below the upper limit of the conditional expression (3), the positive refractive power of the fourth lens becomes appropriate and the low-profileness becomes realizable. On the other hand, when the value is above the lower limit of the conditional expression (3), the spherical aberration and the coma aberration are properly corrected.

According to the imaging lens having the above-described configuration, it is preferable that a below conditional expression (4) is satisfied:

$$0.1 < T3/T4 < 0.5 \tag{4}$$

where

T3: distance along the optical axis from an image-side surface of the third lens to an object-side surface of the fourth lens, and T4: distance along the optical axis from an image-side surface of the fourth lens to the object-side surface of the fifth lens.

The conditional expression (4) defines a ratio of an interval between the third lens and the fourth lens to an interval between the fourth lens and the fifth lens, and is a condition for achieving the low-profileness and the proper aberration corrections. By satisfying the conditional expression (4), difference between the interval of the third lens and the fourth lens and the interval of the fourth lens and the fifth lens is suppressed from being increased, and the low-profileness is achieved. Furthermore, by satisfying the conditional expression (4), the fourth lens is arranged at an optimum position, and aberration correction function of the lens becomes more effective.

According to the imaging lens having the above-described configuration, it is preferable that composite refractive power of the third lens and the fourth lens is positive, and more preferable that a below conditional expression (5) is satisfied:

$$1.3 < f34/f < 5.1 \tag{5}$$

where f34: composite focal length of the third lens and the fourth lens, and f: focal length of the overall optical system of the imaging lens.

When the composite refractive power of the third lens and the fourth lens is positive, the low-profileness becomes more facilitated. The conditional expression (5) defines the composite refractive power of the third lens and the fourth lens, and is a condition for achieving the low-profileness and the proper aberration corrections. When a value is below the upper limit of the conditional expression (5), the positive composite refractive power of the third lens and the fourth lens becomes appropriate, and the low-profileness becomes realizable. On the other hand, when the value is above the lower limit of the conditional expression (5), the astigmatism and the distortion are properly corrected.

According to the imaging lens having the above-described configuration, it is preferable that a below conditional expression (6) is satisfied:

$$0.10 < f1/f4 < 0.55 \tag{6}$$

where f1: focal length of the first lens, and f4: focal length of the fourth lens.

The conditional expression (6) defines a ratio between the focal length of the first lens and the focal length of the fourth lens, and is a condition for achieving the low-profileness and the proper aberration corrections. When a value is below the upper limit of the conditional expression (6), the focal length of the fourth lens is suppressed from being too short, and position of Principal Point can be moved to the object side. Therefore, the low-profileness becomes realizable. Furthermore, the field curvature and the distortion are properly corrected. On the other hand, when the value is above the lower limit of the conditional expression (6), the focal length of the first lens is suppressed from being too short, and the spherical aberration and the coma aberration are properly corrected.

According to the imaging lens having the above-described configuration, it is preferable that a below conditional expression (7) is satisfied:

$$0.45 < (D3/|f3|) \times 1000 < 8.00 \tag{7}$$

where

D3: thickness along the optical axis of the third lens, and f3: focal length of the third lens.

The conditional expression (7) defines an appropriate range of the thickness along the optical axis of the third lens, and is a condition for properly maintaining formability of the third lens and achieving the low-profileness. When a value is below the upper limit of the conditional expression (7), the thickness along the optical axis of the third lens is suppressed from being too large, and an air gap of the object side and the image side of the third lens can be easily secured. As a result, the low-profileness can be maintained. On the other hand, when the value is above the lower limit of the conditional expression (7), the thickness along the optical axis of the third lens is suppressed from being too small, and the formability of the lens becomes excellent.

According to the imaging lens having the above-described configuration, it is preferable that a below conditional expression (8) is satisfied:

$$5 < (T4/TTL) \times 100 < 20 \tag{8}$$

where

T4: distance along the optical axis from an image-side surface of the fourth lens to an object-side surface of the fifth lens, and TTL: total track length.

The conditional expression (8) defines the distance along the optical axis from the image-side surface of the fourth lens to the object-side surface of the fifth lens, and is a condition for achieving the low-profileness and proper aberration corrections. By satisfying the conditional expression (8), the total track length can be shortened, and the coma aberration, the field curvature and the distortion are properly corrected.

According to the imaging lens having the above-described configuration, it is preferable that a below conditional expression (9) is satisfied:

$$1.0 < T4/T5 < 6.3 \tag{9}$$

where

T4: distance along the optical axis from the image-side surface of the fourth lens to the object-side surface of the fifth lens, and T5: distance along the optical axis from the image-side surface of the fifth lens to an object-side surface of the sixth lens.

The conditional expression (9) defines a ratio of an interval between the fourth lens and the fifth lens, and an interval between the fifth lens and the sixth lens, and is a condition for achieving the low-profileness and the proper aberration corrections. By satisfying the conditional expression (9), difference between the interval of the fourth lens and the fifth lens and the interval of the fifth lens and the sixth lens is suppressed from being large, and the low-profileness is achieved. Furthermore, by satisfying the conditional expression (9), the fifth lens is arranged at an optimum position, and aberration correction function of the lens becomes more effective.

According to the imaging lens having the above-described configuration, it is preferable that a below conditional expression (10) is satisfied:

$$5.4 < |f3|/f \tag{10}$$

where f3: focal length of the third lens, and f: focal length of the overall optical system.

The conditional expression (10) defines the refractive power of the third lens, and is a condition for achieving the low-profileness and the proper aberration corrections. When the value is above the lower limit of the conditional expression (10), the total track length is shortened, and the coma aberration and the astigmatism can be properly corrected.

According to the imaging lens having the above-described configuration, it is preferable that a below conditional expression (11) is satisfied:

$$1.4 < |f5|/f < 32.0 \tag{11}$$

where f5: focal length of the fifth lens, and f: focal length of the overall optical system.

The conditional expression (11) defines the refractive power of the fifth lens, and is a condition for achieving the low-profileness and the proper aberration corrections. By satisfying the conditional expression (11), the total track length is shortened, and the chromatic aberration, the astigmatism, the field curvature and the distortion can be properly corrected.

According to the imaging lens having the above-described configuration, it is preferable that a below conditional expression (12) is satisfied:

$$-2.4 < f6/f < -0.4 \tag{12}$$

where f6: focal length of the sixth lens, and f: focal length of the overall optical system.

The conditional expression (12) defines the refractive power of the sixth lens, and is a condition for achieving the low-profileness and the proper aberration corrections. When a value is below the upper limit of the conditional expression (12), negative refractive power of the sixth lens becomes appropriate, and the low-profileness can be achieved. On the other hand, when the value is above the lower limit of the conditional expression (12), the chromatic aberration, the field curvature and the distortion can be properly corrected.

According to the imaging lens having the above-described configuration, it is preferable that a below conditional expression (13) is satisfied:

$$Fno \leq 2.05 \tag{13}$$

where

Fno: F-number.

The conditional expression (13) defines the F-number. When a value is below the upper limit of the conditional expression (13), brightness can be fully secured which is required for the imaging lens in recent years, if it is mounted in a portable mobile device, a digital camera, a monitoring camera, or an onboard camera.

According to the imaging lens having the above-described configuration, it is preferable that the second lens has a meniscus shape near the optical axis.

When the second lens has the meniscus shape near the optical axis, the chromatic aberration, the spherical aberration, the coma aberration and the field curvature are properly corrected.

According to the imaging lens having the above-described configuration, it is preferable that the fourth lens has a meniscus shape near the optical axis.

When the fourth lens has the meniscus shape near the optical axis, the chromatic aberration, the spherical aberration and the distortion are properly corrected.

According to the imaging lens having the above-described configuration, it is preferable that an image-side surface of the sixth lens is formed as an aspheric surface having an off-axial pole point.

When the image-side surface of the sixth lens has the off-axial pole point, the field curvature and the distortion are properly corrected.

According to the imaging lens having the above-described configuration, it is preferable that a below conditional expression (14) is satisfied:

$$-41.0 < (1-N5)/(r10 \times f) \times 1000 < 0.8 \tag{14}$$

where

N5: refractive index at d-ray of the fifth lens, r10: paraxial curvature radius of an image-side surface of the fifth lens, and f: focal length of an overall optical system of the imaging lens.

The conditional expression (14) defines an appropriate range of the refractive power of the image-side surface of the fifth lens, and is a condition for properly correcting the aberrations and reducing the sensitivity to the manufacturing error. By satisfying the conditional expression (14), the refractive power of the image-side surface of the fifth lens becomes appropriate, and the spherical aberration occurred at the fifth lens can be effectively suppressed and the sensitivity to the manufacturing error is effectively reduced.

According to the imaging lens having the above-described configuration, it is preferable that the refractive power of the first lens is positive, and more preferable that a below conditional expression (15) is satisfied:

$$0.35 < f1/f < 1.35 \tag{15}$$

where f1: focal length of the first lens, and f: focal length of the overall optical system of the imaging lens.

When the first lens has the positive refractive power, the low-profileness is more facilitated. Furthermore, the conditional expression (15) defines the refractive power of the first lens, and is a condition for achieving the low-profileness and the proper aberration corrections. When a value is below the upper limit of the conditional expression (15), the positive refractive power of the first lens becomes appropriate, and the low-profileness can be achieved. On the other hand, when the value is above the lower limit of the conditional expression (15), the spherical aberration and the coma aberration are properly corrected.

According to the imaging lens having the above-described configuration, it is preferable that the refractive power of the second lens is negative, and more preferable that a below conditional expression (16) is satisfied:

$$-4.7 < f2/f < -0.8 \quad (16)$$

where f2: focal length of the second lens, and f: focal length of the overall optical system of the imaging lens.

When the second lens has the negative refractive power, the spherical aberration and the chromatic aberration are properly corrected. Furthermore, the conditional expression (16) defines the refractive power of the second lens, and is a condition for achieving the low-profileness and the proper aberration corrections. When a value is below the upper limit of the conditional expression (16), the negative refractive power of the second lens becomes appropriate, and the low-profileness becomes realizable. On the other hand, when the value is above the lower limit of the conditional expression (16), the chromatic aberration and the spherical aberration are properly corrected.

According to the imaging lens having the above-described configuration, it is preferable that composite refractive power of the first lens and the second lens is positive, and more preferable that a below conditional expression (17) is satisfied:

$$0.5 < f12/f < 1.7 \quad (17)$$

where f12: composite focal length of the first lens and the second lens, and f: focal length of the overall optical system of the imaging lens.

When the composite refractive power of the first lens and the second lens is positive, the low-profileness is more facilitated. The conditional expression (17) defines the composite refractive power of the first lens and the second lens, and is a condition for achieving the low-profileness and the proper aberration corrections. When a value is below the upper limit of the conditional expression (17), the positive composite refractive power of the first lens and the second lens becomes appropriate, and the low-profileness becomes realizable. On the other hand, when the value is above the lower limit of the conditional expression (17), the spherical aberration and the coma aberration are properly corrected.

According to the imaging lens having the above-described configuration, it is preferable that composite refractive power of the second lens, the third lens and the fourth lens is negative, and more preferable that a below conditional expression (18) is satisfied:

$$f234/f < -2.65 \quad (18)$$

where f234: composite focal length of the second lens, the third lens and the fourth lens, and f: focal length of the overall optical system of the imaging lens.

When the composite refractive power of the second lens, the third lens and the fourth lens is negative, the chromatic aberration is properly corrected. The conditional expression (18) defines composite refractive power of the second lens, the third lens and the fourth lens, and is a condition for achieving the low-profileness and the proper aberration corrections. When a value is below the upper limit of the conditional expression (18), the negative composite refractive power of the second lens, the third lens and the fourth lens becomes appropriate, and the low-profileness becomes realizable. Furthermore, the spherical aberration and the astigmatism are properly corrected.

Effect of Invention

According to the present invention, there can be provided an imaging lens with high resolution which satisfies, in well balance, demand of the wide field of view, the low-profileness and the low F-number, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5 and 7 are schematic views of the imaging lenses in Examples 1 to 4 according to the embodiments of the present invention, respectively.

Figure 1:
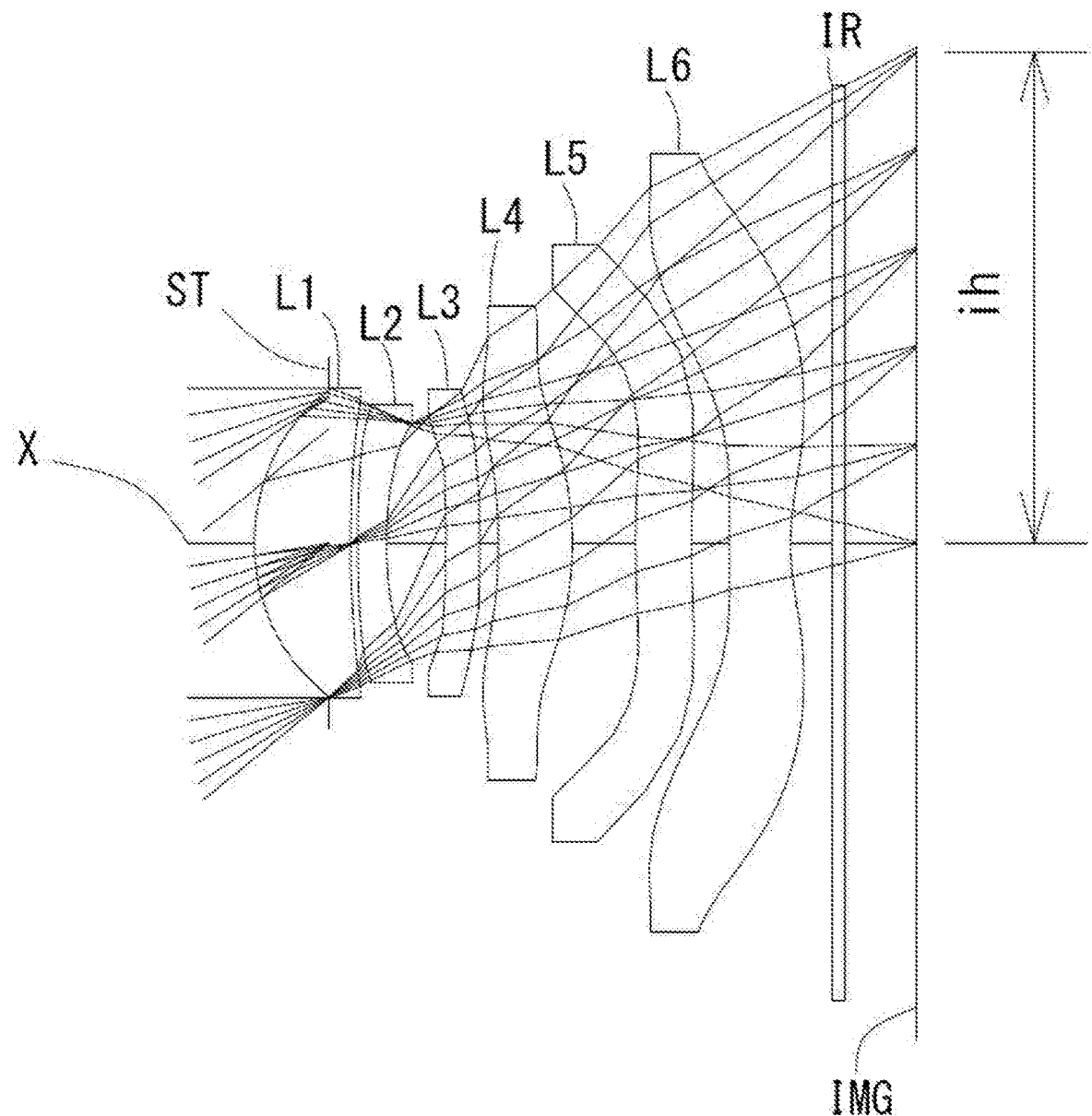
FIG. 1 is a schematic view showing a general configuration of an imaging lens in Example 1 according to the present invention.

As shown in FIG. 1, the imaging lens according to the present embodiments comprises in order from an object side to an image side, a first lens L1, a second lens L2, a third lens L3, a fourth lens L4 having a convex surface facing the object side near an optical axis X, a fifth lens L5 and a sixth lens L6 having a concave surface facing the image side near the optical axis X and negative refractive power.

A filter IR such as an IR cut filter and a cover glass is arranged between the sixth lens L6 and an image plane IMG (namely, the image plane of an image sensor). The filter IR is omissible.

By arranging an aperture stop ST in front of the first lens L1, correction of aberrations and control of the light ray incident angle of high image height to the image sensor become facilitated.

The first lens L1 has the positive refractive power, and the low-profileness is achieved by strengthening the positive refractive power. The shape of the first lens L1 is a meniscus shape having the convex surface facing the object side near the optical axis X, and spherical aberration and distortion are properly corrected.

The second lens L2 has the negative refractive power, and properly corrects the spherical aberration and chromatic aberration occurring at the first lens L1. A shape of the second lens L2 is the meniscus shape having the convex surface facing the object side near the optical axis X, and the chromatic aberration, the spherical aberration, astigmatism, coma aberration and field curvature are properly corrected.

The third lens L3 has the positive refractive power, and properly corrects the coma aberration, the astigmatism and the distortion, while maintaining the low-profileness. A shape of the third lens L3 is a biconvex shape having convex surfaces facing the object side and the image side near the optical axis X, and the low-profileness is achieved by the positive refractive power of the object-side and the image-side surfaces. Furthermore, the biconvex shape suppresses the curvature from being large, and effectively reduces the sensitivity to the manufacturing error. The refractive power of the third lens L3 may be negative as in Examples 2, 3 and 4 shown in FIGS. 3, 5 and 7. In this case, the chromatic aberration is more properly corrected. A shape of the third lens L3 may be the meniscus shape having the convex surface facing the object side near the optical axis X as in Examples 2, 3 and 4 shown in FIGS. 3, 5 and 7. In this case, the astigmatism, the field curvature and the distortion are more properly corrected.

The fourth lens L4 has the positive refractive power, and maintains the low-profileness and properly corrects the spherical aberration and the chromatic aberration. A shape of the fourth lens L4 is the meniscus shape having the concave surface facing the object side near the optical axis X, therefore, light ray incident angle to the fourth lens L4 is appropriately controlled and the chromatic aberration, the spherical aberration, distortion and the astigmatism are properly corrected.

The fifth lens L5 has the positive refractive power, and the astigmatism, the field curvature and the distortion are properly corrected. A shape of the fifth lens L5 is a meniscus shape having the convex surface facing the object side near the optical axis X, therefore the coma aberration, the astigmatism, the field curvature and the distortion are properly corrected. The refractive power of the fifth lens L5 may be negative as in Example 4 shown in FIG. 7. In this case, the chromatic aberration is properly corrected. Furthermore, the shape of the fifth lens L5 may be a biconvex shape having the convex surfaces facing the object side and the image side near the optical axis X as in Example 2 shown in FIG. 3. In this case, the low-profileness is more facilitated by the positive refractive power of the object-side surface and the image-side surface. Furthermore, the biconvex shape has an effect to suppress curvature from being large, and to reduce the sensitivity to the manufacturing error.

The sixth lens L6 has the negative refractive power, and maintains the low-profileness and secures back focus. A shape of the sixth lens L6 is a meniscus shape having the concave surface facing the image side near the optical axis X, therefore both of the low-profileness and the securing the back focus are realized at the same time. Furthermore, the chromatic aberration, the distortion, the astigmatism and the field curvature are properly corrected. In addition, an image-side surface of the sixth lens L6 has an off-axial pole point and the field curvature and the distortion are properly corrected.

Regarding the imaging lens according to the present embodiments, all lenses are single lenses. Configuration without cemented lenses can frequently use the aspheric surfaces, and proper correction of the aberrations can be facilitated. Furthermore, workload for cementing is not required, and manufacturing in low cost becomes realizable.

Regarding the imaging lens according to the present embodiments, a plastic material is used for all of the lenses, and manufacturing is facilitated and mass production in a low cost can be realized. Both-side surfaces of all lenses are appropriate aspheric, and the aberrations are favorably corrected.

The material applied to the lens is not limited to the plastic material. By using glass material, further high performance may be aimed. It is preferable that all of surfaces of lenses are formed as aspheric surfaces, however, spherical surfaces easy to manufacture may be adopted in accordance with required performance.

The imaging lens according to the present embodiments shows preferable effect by satisfying the below conditional expressions (1) to (18).

$$0.85 < vd1/(vd2+vd3) < 1.95 \qquad (1)$$

$$0.15 < vd5/vd6 < 0.55 \qquad (2)$$

$$1.5 < f4/f < 4.0 \qquad (3)$$

$$0.1 < T3/T4 < 0.5 \qquad (4)$$

$$1.3 < f34/f < 5.1 \qquad (5)$$

$$0.10 < f1/f4 < 0.55 \qquad (6)$$

$$0.45 < (D3/|f3|) \times 1000 < 8.00 \qquad (7)$$

$$5 < (T4/TTL) \times 100 < 20 \qquad (8)$$

$$1.0 < T4/T5 < 6.3 \qquad (9)$$

$$5.4 < |f3|/f \qquad (10)$$

$$1.4 < |f5|/f < 32.0 \qquad (11)$$

$$-2.4 < f6/f < -0.4 \qquad (12)$$

$$Fno \leq 2.05 \qquad (13)$$

$$-41.0 < (1-N5)/(r10 \times f) \times 1000 < 0.8 \qquad (14)$$

$$0.35 < f1/f < 1.35 \qquad (15)$$

$$-4.7 < f2/f < -0.8 \qquad (16)$$

$0.5<f12/f<1.7$ (17)

$f234/f<-2.65$ (18)

where
vd1: abbe number at d-ray of the first lens L1,
vd2: abbe number at d-ray of the second lens L2,
vd3: abbe number at d-ray of the third lens L3,
vd5: abbe number at d-ray of the fifth lens L5,
vd6: abbe number at d-ray of the sixth lens L6,
D3: thickness along the optical axis X of the third lens L3,
T3: distance along the optical axis X from an image-side surface of the third lens L3 to an object-side surface of the fourth lens L4,
T4: distance along the optical axis X from an image-side surface of the fourth lens L4 to the object-side surface of the fifth lens L5,
T5: distance along the optical axis X from the image-side surface of the fifth lens L5 to an object-side surface of the sixth lens L6,
N5: refractive index at d-ray of the fifth lens L5,
TTL: total track length,
f: focal length of the overall optical system of the imaging lens,
f1: focal length of the first lens L1,
f2: focal length of the second lens L2,
f3: focal length of the third lens L3,
f4: focal length of the fourth lens L4,
f5: focal length of the fifth lens L5,
f6: focal length of the sixth lens L6,
f12: composite focal length of the first lens L1 and the second lens L2,
f34: composite focal length of the third lens L3 and the fourth lens L4,
f234: composite focal length of the second lens L2, the third lens L3 and the fourth lens L4,
r10: paraxial curvature radius of an image-side surface of the fifth lens L5,
Fno: F-number.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (18a).

$1.10<vd1/(vd2+vd3)<1.65$ (1a)

$0.27<vd5/vd6<0.46$ (2a)

$2.0<f4/f<3.6$ (3a)

$0.2<T3/T4<0.4$ (4a)

$2.0<f34/f<4.2$ (5a)

$0.17<f1/f4<0.43$ (6a)

$0.75<(D3/|f3|)\times1000<6.40$ (7a)

$7<(T4/TTL)\times100<17$ (8a)

$1.35<T4/T5<5.20$ (9a)

$8.1<|f3|/f$ (10a)

$2.1<|f5|/f<27.0$ (11a)

$-2.0<f6/f<-0.6$ (12a)

$Fno \leq 1.95$ (13a)

$-34.0<(1-N5)/(r10\times f)\times1000<0.7$ (14a)

$0.53<f1/f<1.10$ (15a)

$-3.9<f2/f<-1.2$ (16a)

$0.8<f12/f<1.40$ (17a)

$f234/f<-4.00$ (18a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20},$$

Equation 1

Next, examples of the imaging lens according to this embodiment will be explained. In each example, f denotes the focal length of the overall optical system of the imaging lens, Fno denotes an F-number, w denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 Unit mm | |
|---|---|
| f = 5.57 | ih = 4.60 |
| Fno = 1.85 | TTL = 6.14 |
| ω (°) = 38.9 | |

TABLE 1-continued

Example 1
Unit mm

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.6950 | | |
| 2* | 1.8498 | 0.8998 | 1.544 | 55.86 (vd1) |
| 3* | 11.5184 | 0.0640 | | |
| 4* | 12.2479 | 0.2720 | 1.661 | 20.37 (vd2) |
| 5* | 3.9710 | 0.5502 | | |
| 6* | 154.0651 | 0.3140 | 1.661 | 20.37 (vd3) |
| 7* | −199.7972 | 0.1754 | | |
| 8* | −4.8959 | 0.6914 | 1.535 | 55.66 (vd4) |
| 9* | −3.3581 | 0.5903 | | |
| 10* | 11.6768 | 0.5199 | 1.661 | 20.37 (vd5) |
| 11* | 36.9238 | 0.3510 | | |
| 12* | 14.2736 | 0.5696 | 1.535 | 55.66 (vd6) |
| 13* | 2.2692 | 0.1290 | | |
| 14 | Infinity | 0.1100 | 1.515 | 57.00 |
| 15 | Infinity | 0.9450 | | |
| Image Plane | Infinity | | | |

Constituent Lens Data

| Lens | Start Surface | Focal Length | | Composite Focal Length |
|---|---|---|---|---|
| 1 | 2 | 3.920 | f12 | 5.817 |
| 2 | 4 | −9.011 | f34 | 15.436 |
| 3 | 6 | 131.697 | f234 | −30.821 |
| 4 | 8 | 17.284 | | |
| 5 | 10 | 25.635 | | |
| 6 | 12 | −5.130 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −6.559581E−04 | 2.559000E−02 | 2.284504E−02 | 2.682232E−02 | −4.172539E−02 | −3.027155E−02 |
| A6 | 6.442845E−03 | −9.383953E−02 | −5.529928E−02 | −4.032163E−04 | −8.424975E−02 | −8.717156E−02 |
| A8 | −4.408570E−03 | 1.662446E−01 | 1.047506E−01 | 2.178822E−02 | 1.023932E−01 | 1.018458E−01 |
| A10 | 1.764813E−03 | −1.593960E−01 | −9.850767E−02 | −3.805573E−02 | −6.369973E−02 | −6.930064E−02 |
| A12 | −3.511485E−04 | 8.605984E−02 | 5.226970E−02 | 6.428401E−02 | −1.820655E−02 | 2.755993E−02 |
| A14 | 2.509990E−04 | −2.443979E−02 | −1.411061E−02 | −5.239218E−02 | 4.003634E−02 | −3.313245E−03 |
| A16 | −9.457196E−05 | 2.829188E−03 | 1.565588E−03 | 1.777256E−02 | −1.210243E−02 | −3.868398E−04 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.400000E+00 | 0.000000E+00 | 0.000000E+00 | 0.000000E+00 | −1.130349E+01 |
| A4 | 1.039403E−02 | −1.505980E−02 | 3.853971E−02 | 7.933503E−02 | −1.001545E−01 | −6.446041E−02 |
| A6 | −5.509970E−02 | −3.348522E−02 | −9.895048E−02 | −1.122584E−01 | 2.612098E−02 | 1.846708E−02 |
| A8 | 4.845284E−02 | 4.159510E−02 | 6.227574E−02 | 6.251712E−02 | −3.505904E−03 | −2.627240E−03 |
| A10 | 1.374759E−02 | −1.551296E−02 | −2.326417E−02 | −2.130620E−02 | 2.777474E−04 | −4.185365E−05 |
| A12 | −3.091849E−02 | 2.268646E−03 | 5.700107E−03 | 4.797404E−03 | −1.172069E−05 | 7.376613E−05 |
| A14 | 1.541680E−02 | 1.066620E−03 | −9.581516E−04 | −7.250518E−04 | 1.105851E−07 | −1.159327E−05 |
| A16 | −3.733299E−03 | −3.852843E−05 | 1.025728E−04 | 7.094787E−05 | 9.585782E−09 | 8.743948E−07 |
| A18 | 4.560274E−04 | 3.398593E−06 | −5.286202E−06 | −4.042592E−06 | −2.620563E−10 | −3.335456E−08 |
| A20 | −2.251891E−05 | −6.292081E−08 | 3.802779E−08 | 1.012336E−07 | −2.121172E−13 | 5.148077E−10 |

The imaging lens in Example 1 satisfies conditional expressions (1) to (18) as shown in Table 5.

Figure 2:
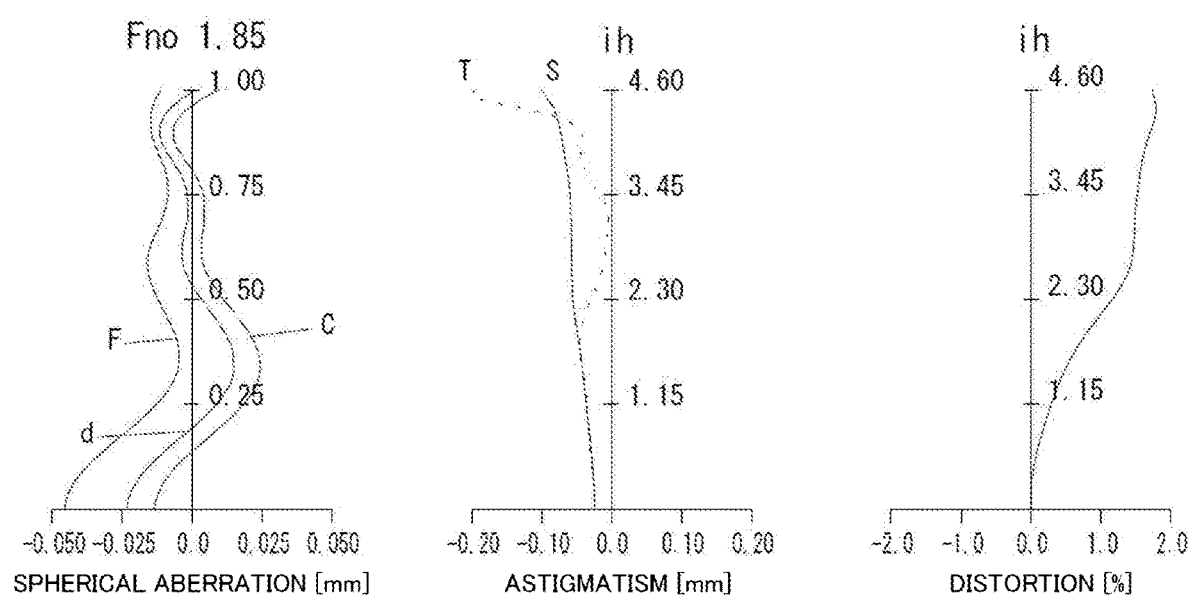
FIG. 2 shows spherical aberration, astigmatism, and distortion of the imaging lens in Example 1 according to the present invention.
Figure 3:
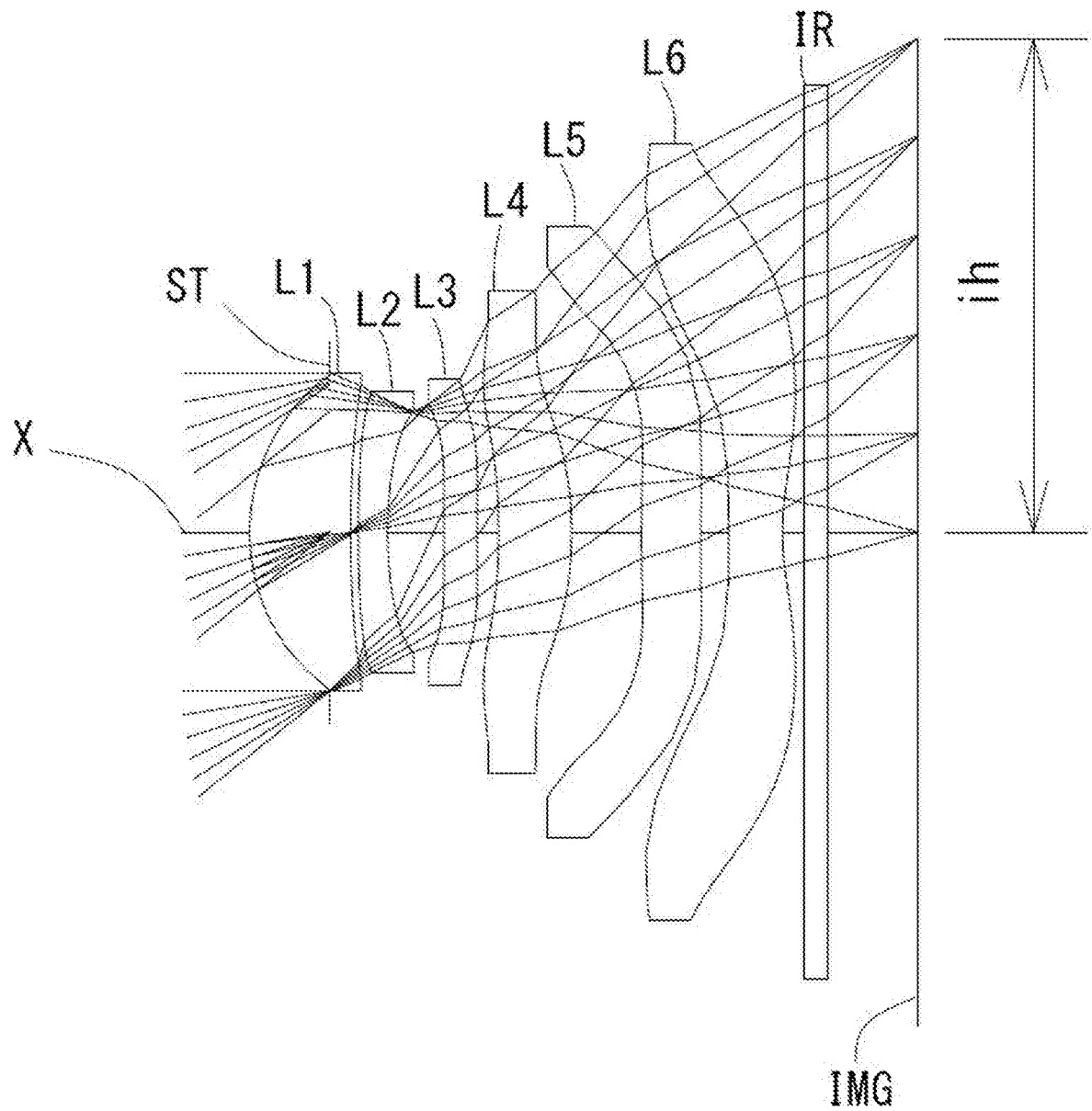
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6 and 8).

Example 2

The basic lens data is shown below in Table 2.

TABLE 2

Example 2
Unit mm f = 5.55  ih = 4.60
Fno = 1.85  TTL = 6.11
ω (°) = 38.9

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7400 | | |
| 2* | 1.8572 | 0.9359 | 1.544 | 55.86 (vd1) |
| 3* | 11.3404 | 0.0734 | | |
| 4* | 14.5777 | 0.2720 | 1.661 | 20.37 (vd2) |
| 5* | 4.2204 | 0.5225 | | |
| 6* | 39.0415 | 0.3116 | 1.661 | 20.37 (vd3) |
| 7* | 32.9021 | 0.1970 | | |
| 8* | −6.3976 | 0.6783 | 1.535 | 55.66 (vd4) |
| 9* | −3.6048 | 0.6462 | | |
| 10* | 12.0963 | 0.5529 | 1.661 | 20.37 (vd5) |
| 11* | −216.4456 | 0.2580 | | |
| 12* | 87.1604 | 0.5010 | 1.535 | 55.66 (vd6) |
| 13* | 2.4060 | 0.2065 | | |
| 14 | Infinity | 0.2100 | 1.517 | 64.20 |
| 15 | Infinity | 0.8163 | | |
| Image Plane | Infinity | | | |

Constituent Lens Data

| Lens | Start Surface | Focal Length | | Composite Focal Length |
|---|---|---|---|---|
| 1 | 2 | 3.943 | f12 | 5.826 |
| 2 | 4 | −9.085 | f34 | 14.887 |
| 3 | 6 | −323.184 | f234 | −33.643 |
| 4 | 8 | 14.236 | | |
| 5 | 10 | 17.355 | | |
| 6 | 12 | −4.636 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −6.342804E−04 | 2.234428E−02 | 2.306549E−02 | 2.963554E−02 | −4.669113E−02 | −4.093846E−02 |
| A6 | 5.655337E−03 | −8.538420E−02 | −5.177875E−02 | −4.176486E−03 | −7.192142E−02 | −7.578732E−02 |
| A8 | −4.022756E−03 | 1.555427E−01 | 1.003881E−01 | 2.612834E−02 | 8.530819E−02 | 8.769303E−02 |
| A10 | 1.821660E−03 | −1.504253E−01 | −9.445740E−02 | −3.889139E−02 | −4.179403E−02 | −5.498314E−02 |
| A12 | −2.846371E−04 | 8.180085E−02 | 4.971829E−02 | 6.084507E−02 | −3.349007E−02 | 1.815010E−02 |
| A14 | 6.266105E−05 | −2.341677E−02 | −1.335419E−02 | −4.914423E−02 | 4.412678E−02 | −1.807224E−04 |
| A16 | −1.876379E−05 | 2.741503E−03 | 1.450510E−03 | 1.649142E−02 | −1.227326E−02 | −7.805473E−04 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.700000E+00 | 0.000000E+00 | 0.000000E+00 | 0.000000E+00 | −1.240285E+01 |
| A4 | −1.828260E−02 | 4.687316E−02 | −4.687316E−02 | 5.398080E−02 | −8.474884E−02 | −6.365190E−02 |
| A6 | −9.335539E−03 | 2.167643E−02 | −4.703180E−02 | −7.841651E−02 | 2.141104E−02 | 1.959963E−02 |
| A8 | −3.486233E−02 | −2.858853E−02 | 1.882355E−02 | 3.503142E−02 | −2.663913E−03 | −2.894987E−03 |
| A10 | 9.957474E−02 | 3.852318E−02 | −1.137796E−03 | −8.494981E−03 | 1.937787E−04 | −6.218703E−05 |
| A12 | −8.176753E−02 | −2.225627E−02 | −7.060111E−04 | 1.260978E−03 | −7.590533E−06 | 8.797136E−05 |
| A14 | 3.352026E−02 | 6.689786E−03 | 1.442286E−05 | −1.309689E−04 | 6.645372E−08 | −1.376079E−05 |
| A16 | −7.581506E−03 | −1.116383E−03 | 5.237772E−05 | 1.114399E−05 | 5.471120E−09 | 1.038188E−06 |
| A18 | 9.076717E−04 | 9.860436E−05 | −9.490414E−06 | −7.225287E−07 | −1.113657E−10 | −3.974873E−08 |
| A20 | −4.508993E−05 | −3.609409E−06 | 5.011811E−07 | 2.301853E−08 | −1.480635E−12 | 6.182129E−10 |

The imaging lens in Example 2 satisfies conditional expressions (1) to (18) as shown in Table 5.

Figure 4:
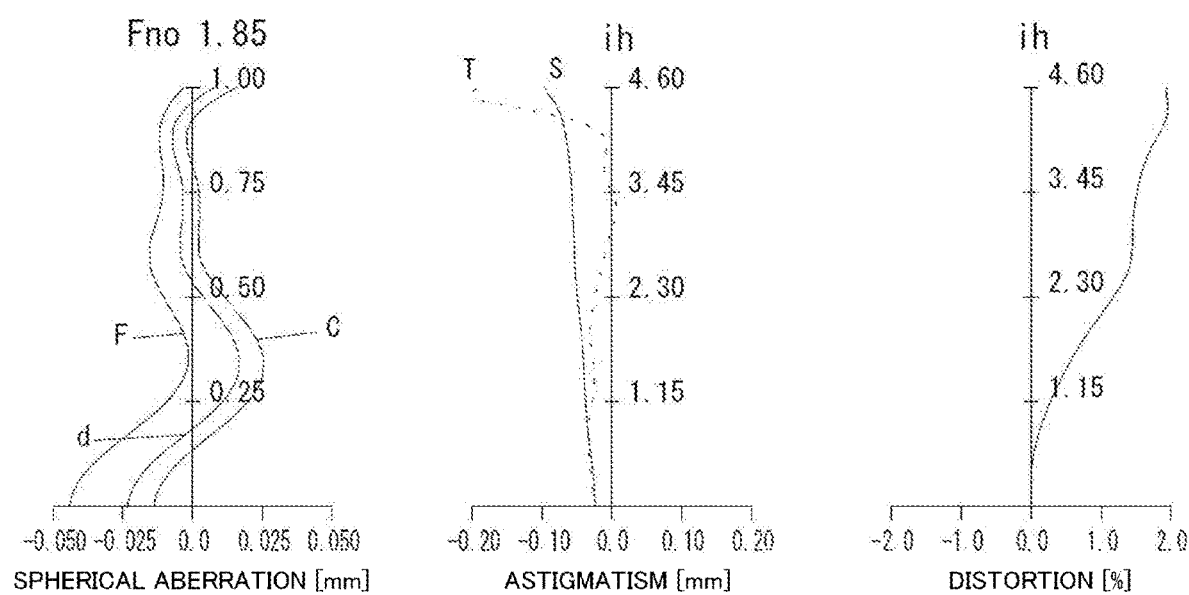
FIG. 4 shows spherical aberration, astigmatism, and distortion of the imaging lens in Example 2 according to the present invention.
Figure 5:
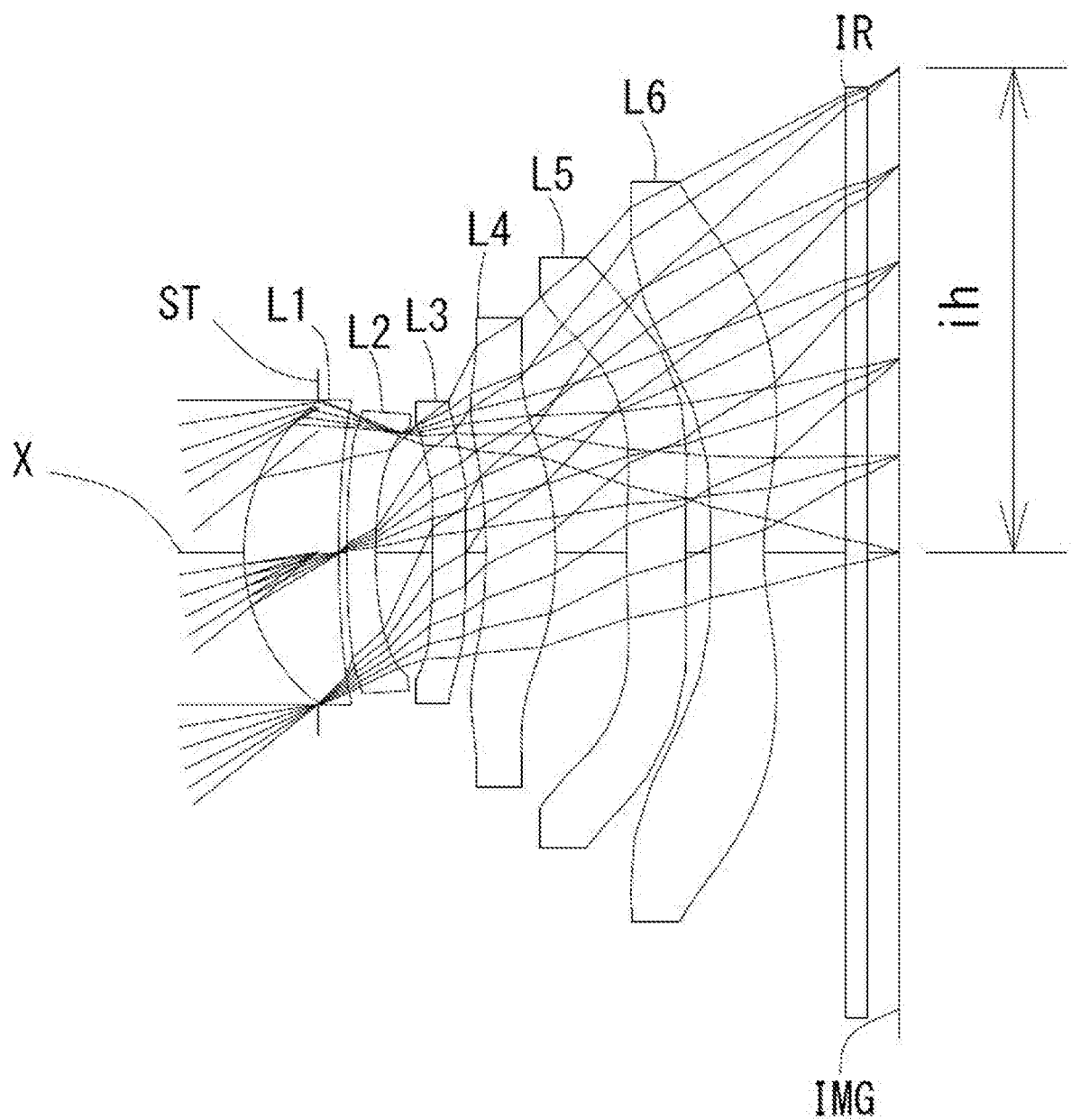
FIG. 5 is a schematic view showing the general configuration of an imaging lens in Example 3 according to the present invention.

FIG. 4 shows spherical aberration (mm), astigmatism (mm), and distortion (%) of the imaging lens in Example 2.

Example 3

The basic lens data is shown below in Table 3.

TABLE 3

Example 3
Unit mm

| | | |
|---|---|---|
| f = 5.56 | | ih = 4.60 |
| Fno = 1.85 | | TTL = 6.11 |
| ω (°) = 38.9 | | |

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7000 | | |
| 2* | 1.8455 | 0.8971 | 1.544 | 55.86 (vd1) |
| 3* | 10.8183 | 0.0768 | | |
| 4* | 13.4155 | 0.2720 | 1.661 | 20.37 (vd2) |
| 5* | 4.1391 | 0.5373 | | |
| 6* | 37.3848 | 0.3132 | 1.661 | 20.37 (vd3) |
| 7* | 27.8952 | 0.1923 | | |
| 8* | −6.2573 | 0.6606 | 1.535 | 55.66 (vd4) |
| 9* | −3.6041 | 0.6714 | | |
| 10* | 10.2553 | 0.5600 | 1.661 | 20.37 (vd5) |
| 11* | 359.8995 | 0.2360 | | |
| 12* | 38.8894 | 0.5029 | 1.535 | 55.66 (vd6) |
| 13* | 2.3210 | 0.7677 | | |
| 14 | Infinity | 0.2100 | 1.517 | 64.20 |
| 15 | Infinity | 0.2838 | | |
| Image Plane | Infinity | | | |

Constituent Lens Data

| Lens | Start Surface | Focal Length | | Composite Focal Length |
|---|---|---|---|---|
| 1 | 2 | 3.949 | f12 | 5.828 |
| 2 | 4 | −9.166 | f34 | 15.956 |
| 3 | 6 | −168.531 | f234 | −29.504 |
| 4 | 8 | 14.624 | | |
| 5 | 10 | 15.966 | | |
| 6 | 12 | −4.638 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.946121E−04 | 2.267080E−02 | 2.353818E−02 | 3.022076E−02 | −4.770152E−02 | −4.202540E−02 |
| A6 | 5.786111E−03 | −8.749157E−02 | −5.306485E−02 | −4.406100E−03 | −7.447459E−02 | −7.802990E−02 |
| A8 | −4.149531E−03 | 1.610588E−01 | 1.040789E−01 | 2.695961E−02 | 8.800908E−02 | 9.080999E−02 |
| A10 | 1.929501E−03 | −1.573373E−01 | −9.874235E−02 | −4.023377E−02 | −4.356354E−02 | −5.752268E−02 |
| A12 | −2.961480E−04 | 8.642653E−02 | 5.254263E−02 | 6.427705E−02 | −3.543918E−02 | 1.912507E−02 |
| A14 | 6.614429E−05 | −2.498795E−02 | −1.424717E−02 | −5.243613E−02 | 4.708012E−02 | −2.129969E−04 |
| A16 | −2.468631E−05 | 2.952803E−03 | 1.563187E−03 | 1.777252E−02 | −1.320184E−02 | −8.224367E−04 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.600000E+00 | 0.000000E+00 | 0.000000E+00 | 0.000000E+00 | −1.247092E+01 |
| A4 | −1.748117E−02 | −4.754487E−02 | −2.811301E−03 | 6.393265E−02 | −8.704856E−02 | −6.468958E−02 |
| A6 | −1.648781E−02 | 2.162668E−02 | −4.769532E−02 | −8.756304E−02 | 2.196503E−02 | 2.013024E−02 |
| A8 | −2.216618E−02 | −2.887865E−02 | 1.665962E−02 | 4.030752E−02 | −2.756181E−03 | −2.998648E−03 |
| A10 | 9.115253E−02 | 4.078847E−02 | 1.827636E−03 | −1.049712E−02 | 2.027897E−04 | −6.512143E−05 |
| A12 | −7.928899E−02 | −2.425107E−02 | −2.679381E−03 | 1.740165E−03 | −8.016603E−06 | 9.292714E−05 |
| A14 | 3.333797E−02 | 7.445778E−03 | 7.527842E−04 | −1.999273E−04 | 7.067856E−08 | −1.468296E−05 |
| A16 | −7.644853E−03 | −1.260980E−03 | −1.032320E−04 | 1.664855E−05 | 5.850558E−09 | 1.118834E−06 |
| A18 | 9.210592E−04 | 1.122233E−04 | 7.637359E−06 | −9.240680E−07 | −1.249598E−10 | −4.326534E−08 |
| A20 | −4.574249E−05 | −4.106910E−06 | −2.617430E−07 | 2.464162E−08 | −1.479305E−12 | 6.799722E−10 |

The imaging lens in Example 3 satisfies conditional expressions (1) to (18) as shown in Table 5.

Figure 6:
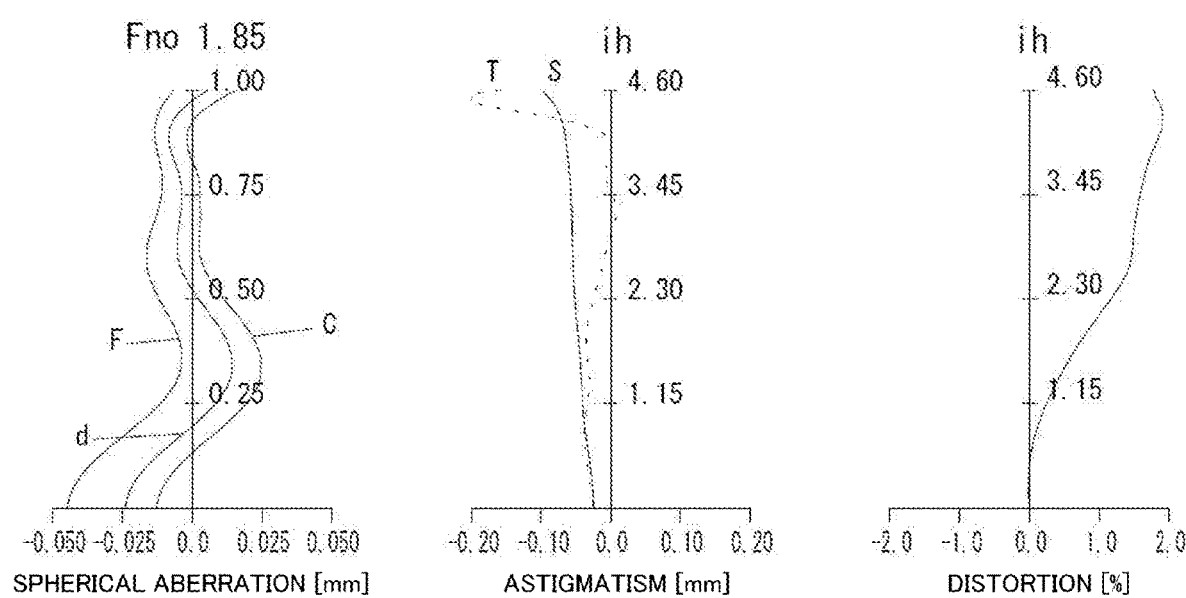
FIG. 6 shows spherical aberration, astigmatism, and distortion of the imaging lens in Example 3 according to the present invention.
Figure 7:
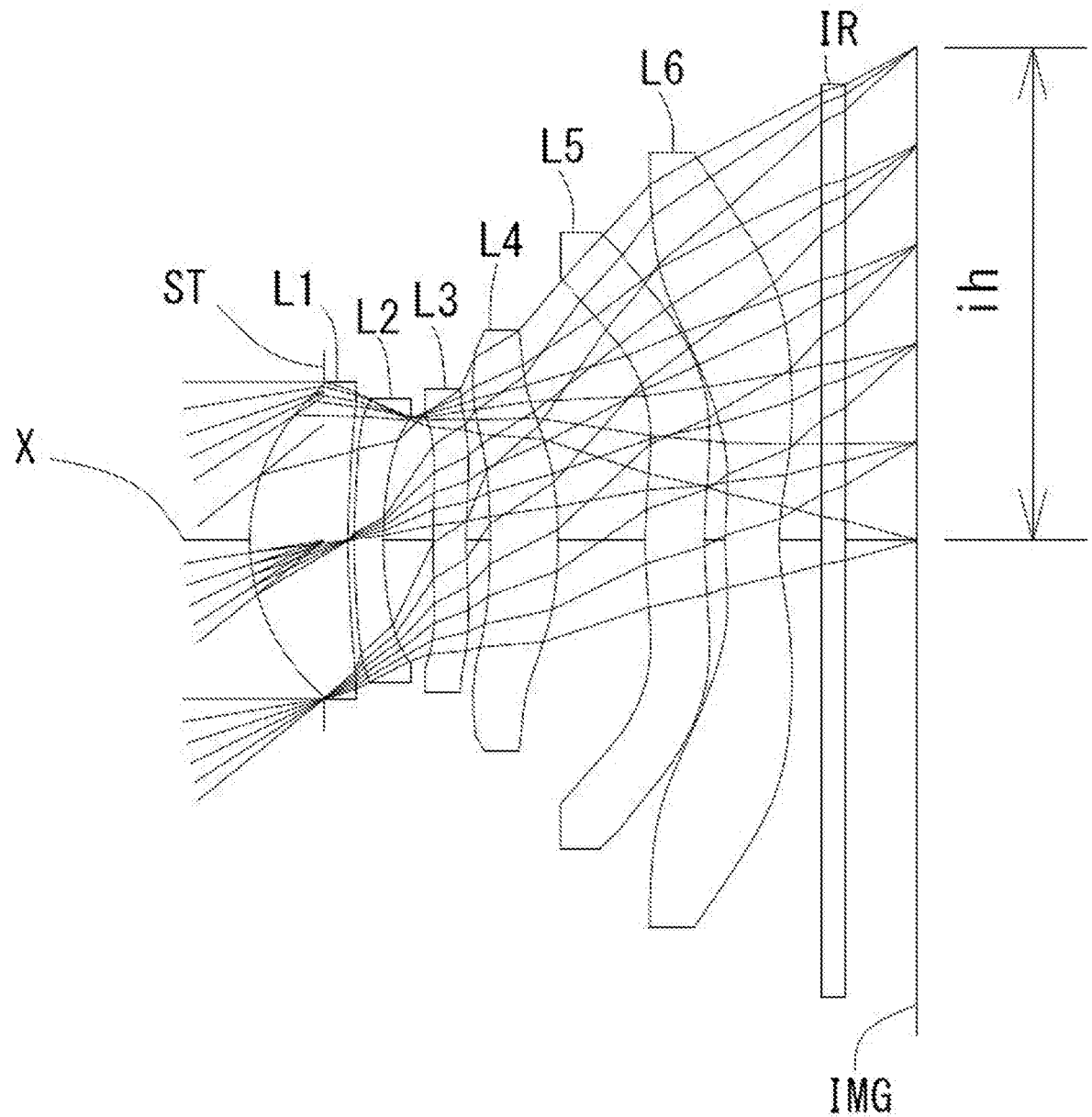
FIG. 7 is a schematic view showing the general configuration of an imaging lens in Example 4 according to the present invention.

FIG. 6 shows spherical aberration (mm), astigmatism (mm), and distortion (%) of the imaging lens in Example 3.

Example 4

The basic lens data is shown below in Table 4.

TABLE 4

Example 4
Unit mm f = 5.57  ih = 4.60
Fno = 1.85  TTL = 6.12
ω (°) = 39.0

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.6864 | | |
| 2* | 1.8569 | 0.9100 | 1.544 | 55.86 (vd1) |
| 3* | 5.0049 | 0.0603 | | |
| 4* | 5.1448 | 0.2720 | 1.661 | 20.37 (vd2) |
| 5* | 3.4735 | 0.4625 | | |
| 6* | 8.3024 | 0.3100 | 1.661 | 20.37 (vd3) |
| 7* | 6.7689 | 0.2203 | | |
| 8* | −10.0238 | 0.6302 | 1.535 | 55.66 (vd4) |
| 9* | −4.4430 | 0.8128 | | |
| 10* | 4.8191 | 0.5500 | 1.661 | 20.37 (vd5) |
| 11* | 4.3335 | 0.1947 | | |
| 12* | 3.6522 | 0.5010 | 1.535 | 55.66 (vd6) |
| 13* | 1.9622 | 0.4000 | | |
| 14 | Infinity | 0.2100 | 1.517 | 64.20 |
| 15 | Infinity | 0.6567 | | |
| Image Plane | Infinity | | | |

Constituent Lens Data

| Lens | Start Surface | Focal Length | | Composite Focal Length |
|---|---|---|---|---|
| 1 | 2 | 4.922 | f12 | 6.158 |
| 2 | 4 | −17.302 | f34 | 18.827 |
| 3 | 6 | −60.312 | f234 | −1151.202 |
| 4 | 8 | 14.356 | | |
| 5 | 10 | −118.482 | | |
| 6 | 12 | −8.842 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −9.111594E−03 | −1.375849E−01 | −1.594074E−01 | −7.325244E−02 | −9.922091E−02 | −9.510008E−02 |
| A6 | 4.390541E−02 | 1.861026E−01 | 2.243824E−01 | 3.004185E−01 | 1.650987E−01 | 6.241214E−02 |
| A8 | −1.180540E−01 | −2.227964E−01 | −1.887395E−01 | −8.856036E−01 | −6.422379E−01 | −1.284175E−01 |
| A10 | 2.000953E−01 | 2.776258E−01 | 1.578480E−01 | 2.136778E+00 | 1.595913E+00 | 2.124838E−01 |
| A12 | −2.130619E−01 | −2.788869E−01 | −1.409545E−01 | −3.415915E+00 | −2.533675E+00 | −2.472751E−01 |
| A14 | 1.422831E−01 | 1.868630E−01 | 1.028481E−01 | 3.486739E+00 | 2.543245E+00 | 1.877763E−01 |
| A16 | −5.789803E−02 | −7.704877E−02 | −4.896303E−02 | −2.181214E+00 | −1.570309E+00 | −8.583508E−02 |
| A18 | 1.314307E−02 | 1.767026E−02 | 1.325383E−02 | 7.619823E−01 | 5.459317E−01 | 2.172014E−02 |
| A20 | −1.286694E−03 | −1.731680E−03 | −1.546597E−03 | −1.132203E−01 | −8.174229E−02 | −2.371466E−03 |

| | Eighth Surface | Ninth Surface | Tenth Surface | Eleventh Surface | Twelfth Surface | Thirteenth Surface |
|---|---|---|---|---|---|---|
| k | 0.000000E+00 | −6.000000E+00 | 0.000000E+00 | 0.000000E+00 | 0.000000E+00 | −1.058352E+01 |
| A4 | −6.188089E−02 | −6.111057E−02 | −4.790255E−02 | −9.157841E−02 | −2.910210E−01 | −1.090455E−01 |
| A6 | −1.376293E−02 | −1.737701E−03 | −2.110406E−02 | 3.635774E−02 | 1.704165E−01 | 5.449575E−02 |
| A8 | 9.993203E−02 | 4.210796E−02 | 2.778180E−02 | −1.920033E−02 | −6.164386E−02 | −1.594843E−02 |
| A10 | −1.776434E−01 | −5.357525E−02 | −2.745452E−02 | 6.152359E−03 | 1.424323E−02 | 2.946430E−03 |
| A12 | 1.841311E−01 | 4.314689E−02 | 1.630409E−02 | −8.422575E−04 | −2.130098E−03 | −3.658126E−04 |
| A14 | −1.049806E−01 | −1.992599E−02 | −5.460821E−03 | −2.881454E−05 | 2.059452E−04 | 3.089347E−05 |
| A16 | 3.276377E−02 | 5.121228E−03 | 1.023742E−03 | 2.266185E−05 | −1.247888E−05 | −1.704859E−06 |
| A18 | −5.282316E−03 | −6.904365E−04 | −1.003743E−04 | −2.477601E−06 | 4.323906E−07 | 5.518661E−08 |
| A20 | 3.450721E−04 | 3.841306E−05 | 4.007943E−06 | 8.927946E−08 | −6.557250E−09 | −7.898252E−10 |

The imaging lens in Example 4 satisfies conditional expressions (1) to (18) as shown in Table 5.

Figure 8:
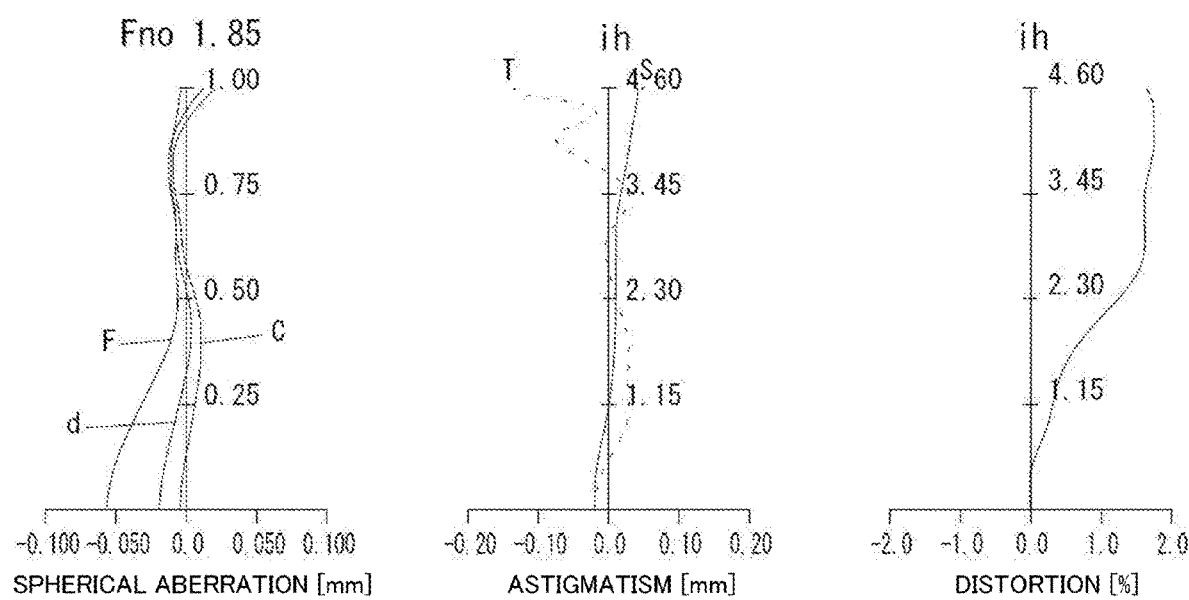
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4.

In table 5, values of conditional expressions (1) to (18) related to the Examples 1 to 4 are shown.

TABLE 5

| | Conditional expression | Example 1 | Example 2 | Example 3 | Example 4 |
|---|---|---|---|---|---|
| (1) | vd1/(vd2 + vd3) | 1.37 | 1.37 | 1.37 | 1.37 |
| (2) | vd5/vd6 | 0.37 | 0.37 | 0.37 | 0.37 |
| (3) | f4/f | 3.11 | 2.56 | 2.63 | 2.58 |
| (4) | T3/T4 | 0.30 | 0.30 | 0.29 | 0.27 |
| (5) | f34/f | 2.77 | 2.68 | 2.87 | 3.38 |
| (6) | f1/f4 | 0.23 | 0.28 | 0.27 | 0.34 |
| (7) | (D3/\|f3\|) × 1000 | 2.38 | 0.96 | 1.86 | 5.14 |
| (8) | (T4/TTL) × 100 | 9.61 | 10.58 | 10.99 | 13.28 |
| (9) | T4/T5 | 1.68 | 2.50 | 2.84 | 4.17 |
| (10) | \|f3\|/f | 23.66 | 58.21 | 30.30 | 10.83 |
| (11) | \|f5\|/f | 4.61 | 3.13 | 2.87 | 21.27 |
| (12) | f6/f | −0.92 | −0.84 | −0.83 | −1.59 |
| (13) | Fno | 1.85 | 1.85 | 1.85 | 1.85 |
| (14) | (1 − N5)/(r10 × f) × 1000 | −3.22 | 0.55 | −0.33 | −27.37 |
| (15) | f1/f | 0.70 | 0.71 | 0.71 | 0.88 |
| (16) | f2/f | −1.62 | −1.64 | −1.65 | −3.11 |
| (17) | f12/f | 1.05 | 1.05 | 1.05 | 1.11 |
| (18) | f234/f | −5.54 | −6.06 | −5.30 | −206.68 |

When the imaging lens according to the present invention is adopted to a product with the camera function, contribution is made to the wide field of view, the low-profileness and the low F-number of the camera and also to high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: image plane

What is claimed is:

1. An imaging lens comprising in order from an object side to an image side,
   a first lens,
   a second lens,
   a third lens,
   a fourth lens having a concave surface facing the object side near an optical axis,
   a fifth lens, and
   a sixth lens having the concave surface facing the image side near the optical axis and negative refractive power, wherein said second lens has a convex surface facing the object side near the optical axis, composite refractive power of said second lens, said third lens and said fourth lens is negative, and below conditional expressions (1), (2) and (10) are satisfied:

$$0.85 < vd1/(vd2+vd3) < 1.95 \quad (1)$$

$$0.15 < vd5/vd6 < 0.55 \quad (2)$$

$$5.4 < |f3|/f$$

where
vd1: abbe number at d-ray of the first lens,
vd2: abbe number at d-ray of the second lens,
vd3: abbe number at d-ray of the third lens,
vd5: abbe number at d-ray of the fifth lens, and
vd6: abbe number at d-ray of the sixth lens,
f3: focal length of the third lens, and
f: focal length of the overall optical system of the imaging lens.

2. The imaging lens according to claim 1, wherein a below conditional expression (5) is satisfied:

$$1.3 < f34/f < 5.1 \quad (5)$$

where
f34: composite focal length of the third lens and the fourth lens, and
f: focal length of the overall optical system of the imaging lens.

3. The imaging lens according to claim 1, wherein a below conditional expression (6) is satisfied:

$$0.10 < f1/f4 < 0.55 \quad (6)$$

where
f1: focal length of the first lens, and
f4: focal length of the fourth lens.

4. The imaging lens according to claim 1, wherein a below conditional expression (7) is satisfied:

$$0.45 < (D3/|f3|) \times 1000 < 8.00 \quad (7)$$

where
D3: thickness along the optical axis of the third lens, and
f3: focal length of the third lens.

5. The imaging lens according to claim 1, wherein a below conditional expression (8) is satisfied:

$$5 < (T4/TTL) \times 100 < 20 \quad (8)$$

where
T4: distance along the optical axis from an image-side surface of the fourth lens to the object-side surface of the fifth lens, and
TTL: total track length.

6. The imaging lens according to claim 1, wherein a below conditional expression (9) is satisfied:

$$1.0 < T4/T5 < 6.3 \quad (9)$$

where
T4: distance along the optical axis from an image-side surface of the fourth lens to the object-side surface of the fifth lens, and
T5: distance along the optical axis from the image-side surface of the fifth lens to an object-side surface of the sixth lens.

7. The imaging lens according to claim 1, wherein a below conditional expression (11) is satisfied:

$$1.4 < |f5|/f < 32.0 \quad (11)$$

where
f5: focal length of the fifth lens, and
f: focal length of the overall optical system of the imaging lens.

8. The imaging lens according to claim 1, wherein a below conditional expression (12) is satisfied:

$$-2.4 < f6/f < -0.4 \quad (12)$$

Where
f6: focal length of the sixth lens, and
f: focal length of the overall optical system of the imaging lens.

9. The imaging lens according to claim 1, wherein a below conditional expression (13) is satisfied:

$$Fno \leq 2.05 \quad (13)$$

where

Fno: F-number.

10. An imaging lens comprising in order from an object side to an image side, a first lens,
a second lens,
a third lens,
a fourth lens having a concave surface facing the object side near an optical axis,
a fifth lens, and
a sixth lens having the concave surface facing the image side near the optical axis and negative refractive power, wherein said fifth lens has a convex surface facing the object side near the optical axis, and below conditional expressions (3) and (4) are satisfied:

$$1.5 < f4/f < 4.0 \tag{3}$$

$$0.1 < T3/T4 < 0.5 \tag{4}$$

where f4: focal length of the fourth lens,
f: focal length of the overall optical system of the imaging lens,
T3: distance along the optical axis from an image-side surface of the third lens to an object-side surface of the fourth lens, and
T4: distance along the optical axis from an image-side surface of the fourth lens to the object-side surface of the fifth lens.

11. The imaging lens according to claim 10, wherein a below conditional expression (5) is satisfied:

$$1.3 < f34/f < 5.1 \tag{5}$$

where f34: composite focal length of the third lens and the fourth lens, and
f: focal length of the overall optical system of the imaging lens.

12. The imaging lens according to claim 10, wherein a below conditional expression (6) is satisfied:

$$0.10 < f1/f4 < 0.55 \tag{6}$$

where f1: focal length of the first lens, and
f4: focal length of the fourth lens.

13. The imaging lens according to claim 10, wherein a below conditional expression (7) is satisfied:

$$0.45 < (D3/|f3|) \times 1000 < 8.00 \tag{7}$$

where

D3: thickness along the optical axis of the third lens, and
f3: focal length of the third lens.

14. The imaging lens according to claim 10, wherein a below conditional expression (8) is satisfied:

$$5 < (T4/TTL) \times 100 < 20 \tag{8}$$

where

T4: distance along the optical axis from an image-side surface of the fourth lens to the object-side surface of the fifth lens, and
TTL: total track length.

15. The imaging lens according to claim 10, wherein a below conditional expression (9) is satisfied:

$$1.0 < T4/T5 < 6.3 \tag{9}$$

where

T4: distance along the optical axis from an image-side surface of the fourth lens to the object-side surface of the fifth lens, and
T5: distance along the optical axis from the image-side surface of the fifth lens to an object-side surface of the sixth lens.

16. The imaging lens according to claim 10, wherein a below conditional expression (10) is satisfied:

$$5.4 < |f3|/f \tag{10}$$

where f3: focal length of the third lens, and
f: focal length of the overall optical system of the imaging lens.

17. The imaging lens according to claim 10, wherein a below conditional expression (11) is satisfied:

$$1.4 < |f5|/f < 32.0 \tag{11}$$

where f5: focal length of the fifth lens, and
f: focal length of the overall optical system of the imaging lens.

18. The imaging lens according to claim 10, wherein a below conditional expression (12) is satisfied:

$$-2.4 < f6/f < -0.4 \tag{12}$$

Where f6: focal length of the sixth lens, and
f: focal length of the overall optical system of the imaging lens.

19. The imaging lens according to claim 10, wherein a below conditional expression (13) is satisfied:

$$Fno \leq 2.05 \tag{13}$$

where

Fno: F-number.

* * * * *